United States Patent [19]

Wann

[11] Patent Number: 4,949,076
[45] Date of Patent: Aug. 14, 1990

[54] APPARATUS FOR DETECTING AND LOCATING LEAKAGE IN UNDERWATER STRUCTURES

[75] Inventor: Laymond D. Wann, Ponca City, Okla.

[73] Assignee: Conoco Inc., Ponca City, Okla.

[21] Appl. No.: 258,298

[22] Filed: Oct. 13, 1988

[51] Int. Cl.$^5$ .............................................. G01V 1/38
[52] U.S. Cl. ................................. 340/605; 324/533; 324/535; 324/642; 324/668; 73/49.3
[58] Field of Search ............... 324/533, 527, 531, 532, 324/534, 535, 530, 58.5 C, 58.5 B, 61 QS, 61 QL; 340/605; 73/46, 49.1, 49.2 R, 49.3, 49.5

[56] References Cited

U.S. PATENT DOCUMENTS

| | | | |
|---|---|---|---|
| 3,424,002 | 1/1969 | Johnson | 73/290 |
| 3,981,181 | 9/1976 | Ochiai | 73/40.5 R |
| 4,043,180 | 8/1977 | Morris et al. | 324/61 QS |
| 4,468,609 | 8/1984 | Schmidt | 324/61 QS |
| 4,480,251 | 10/1984 | McNaughton et al. | 340/604 |
| 4,695,787 | 9/1987 | Billet et al. | 340/605 |

*Primary Examiner*—Joseph A. Orsino
*Assistant Examiner*—Jill Jackson

[57] ABSTRACT

A system for leak detection in underwater structures wherein each critical leakage test point is maintained dry by an enclosure and a test cable is led down through the series of enclosures in fluid-tight manner to support a test probe within the dry test point volume. The test cable is a coaxial cable of selected characteristic impedance and each probe consists of a spirally wound, open-end dual pair supported on a plastic stub so as to constitute a parallel resonant circuit at a selected frequency. Thereafter, a test pulse is conducted down the coaxial cable and the impedance of any probe will be altered by the presence of water to produce a reflected pulse back up the coaxial cable to be detected and input to gating and counting circuitry to determine signal travel duration and, therefore, distance along the cable, as processing, printing and readout components provide output indications.

10 Claims, 3 Drawing Sheets

APPARATUS FOR DETECTING AND LOCATING LEAKAGE IN UNDERWATER STRUCTURES

BACKGROUND OF THE INVENTION

1. Field of the Invention

The present invention relates to apparatus for detecting and indicating leakage in underwater structures and more particularly, but not by way of limitation, it relates to an improved form of probe detector and transmission system for detecting water leakage at crucial underwater locations, such as weld joints and the like, utilizing time domain reflectometry to continually interrogate for the underwater condition while providing a suitable record at the surface position.

2. Description of the Prior Art

The prior art has utilized various forms of sensor and contact structure for determining the presence of moisture or water at or near leakage prone positions. In particular, U.S. Pat. No. 3,981,181 in the name of Ochiai teaches a method for liquid leakage detection that utilizes separation of two conductors by means of a porous insulation material as disposed beneath a tank type of structure wherein pulse reflection is utilized to measure distance along the tank for purposes of locating the leak. A system of time domain reflectometry (TDR) is utilized to convey electronically the trouble indication and location along a linear layout.

U.S. Pat. No. 4,480,251 to McNaughton et al. is of interest for its disclosure of moisture sensing apparatus that utilizes a helical wrap of moisture detecting tape consisting of parallel, spaced conductors. This device utilizes a moisture detection tape that is helically wound along the full length of a cable linkage to indicate leakage of moisture on selected cables, i.e., main line, branches and interconnections. U.S. Pat. No. 3,424,002 in the name of Johnson is an earlier teaching of the use of time domain reflectometry along an immersed transmission line probe for the purpose of detecting liquid level interfaces. This patent too conveys data by means of time domain reflectometry to display output of liquid levels, particularly a range of organic fluids which separate into distinct interfaces.

SUMMARY OF THE INVENTION

The invention is directed to detection of leakage in or about critical points or joints on underwater barbettes or tank structure and includes a coaxial cable led downward through one or a plurality of enclosures which are weld-secured over a critical point such as a weld joint. Inside of the enclosures the transmission line is connected to a probe consisting of a nylon rod with helically wound two-wire conductors having characteristic impedance. A pulse generator periodically provides a pulse input to the transmission line for travel therealong, and failure or leakage in an enclosure tends to short circuit the inductance-capacitance relationship of the probe member such that it reflects a pulse back up the coaxial transmission line; whereupon, gating and counter circuitry resolves the return failure pulse as well as its distance along the transmission line for output to various types of recording and/or transmission circuitry.

Therefore, it is an object of the invention to provide leak detection circuitry for underwater structures that is fully automated.

It is further an object of the invention to provide such a leak detection system that provides greater accuracy for distance measurements along a testing alignment.

It is yet another object of the present invention to provide a system for leak detection that can provide determination of more than one leakage point as well as the distance along the test line for each.

Finally, it is an object of the invention to provide a system for testing weldments in underwater structures for determining the presence and location of leakage points while having the capability to alarm and to transmit to distant positions.

Other objects and advantages of the invention will be evident from the following detailed description when read in conjunction with the accompanying drawings which illustrate the invention.

DETAILED DESCRIPTION OF THE INVENTION

Figure 1:
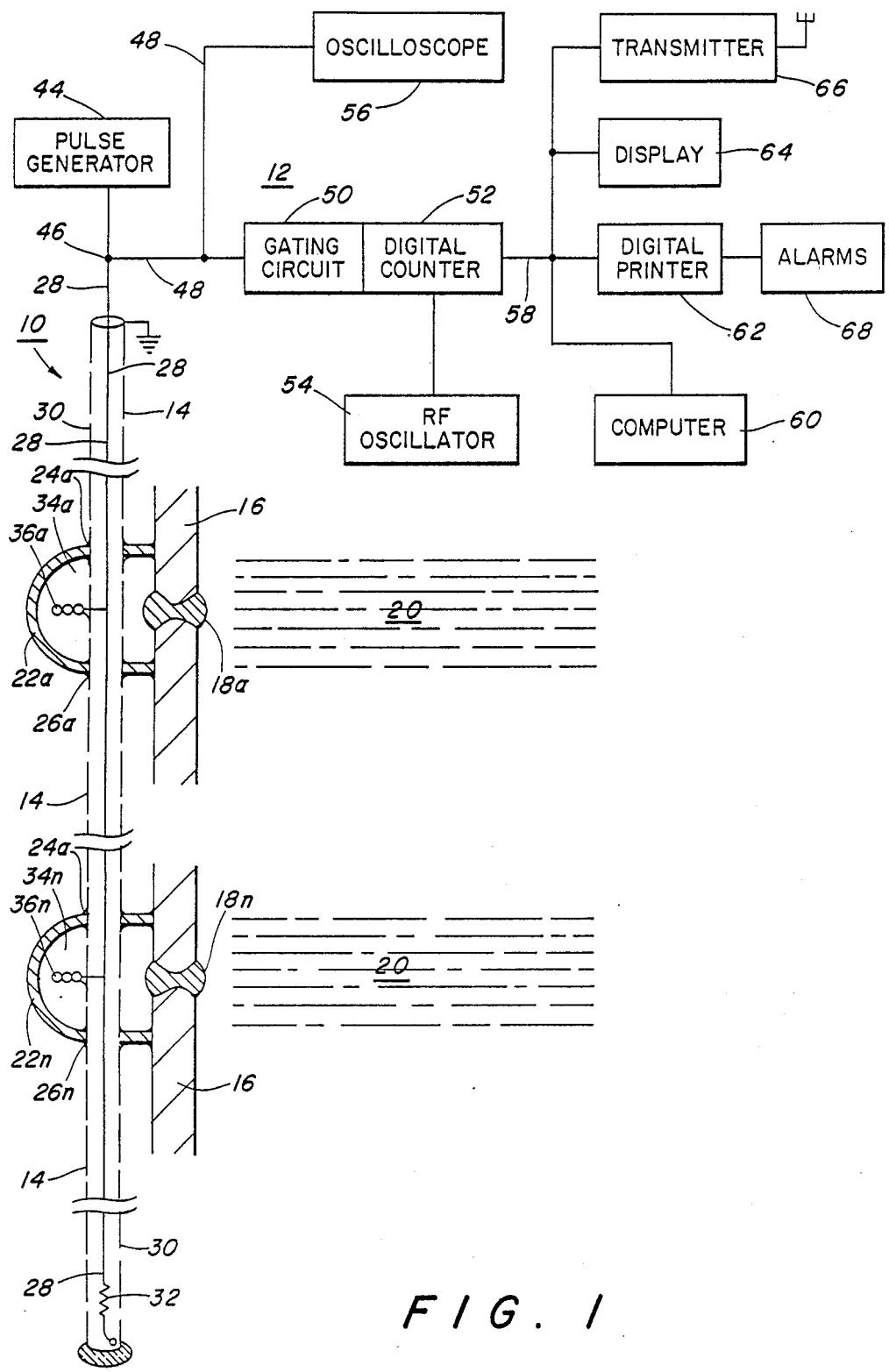
FIG. 1 is an idealized illustration of the testing transmission line with block diagram of associated circuitry for the system of the invention.

Referring to FIG. 1, the system 10 consists of a control position 12 with electrical connection to a test transmission line 14 that is disposed adjacent a tank wall 6. The tank wall 16, including a plurality of weldments 18a through 18n, is in contact with water 20 on the one side with transmission line 14 led therealong on the dry side.

Each of weldments 18a—n is enclosed on the dry side of wall 16 by means of respective enclosure members 22a—n which are welded on opposite sides of respective weldments 18a—n. The transmission line 14, a coaxial cable of selected characteristic impedance, is then led downward through each of the successive enclosure members 22a—n and coupled through by means of fluid-tight feed-through members 24a—n and 26a—n. The feed-through structures 24, 26 may be waterproof packing or they may take the form of some more specific feed-through hardware that is commercially available.

The transmission line 14 consists of a co-axial cable having a central conductor 28 and a co-axial outer shielding 30 which is maintained at ground potential. The conductor 28 includes a terminating resistor 32 proximate its extreme end or terminus; the other end of the resistor is electrically connected to the outer shielding 30. The terminating circuit is then capped to effect water-tight sealing. The terminating resistor 32 serves to generate a reflected pulse that may then be received at control position 12 as the condition of the entire cable is monitored.

Figure 2:
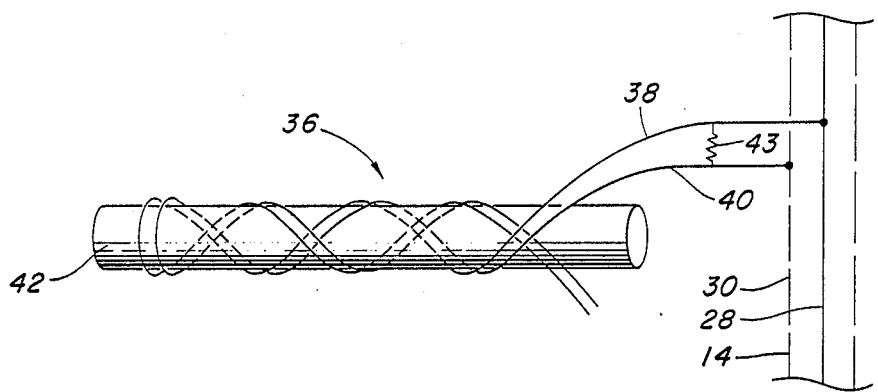
FIG. 2 is a partially schematic perspective view of a probe as utilized in the present invention.

Within each of the dry cavities or voids 34a—n is disposed one of a plurality of probes 36a—n. As shown in FIG. 2, each of the probes 36 consists of wire segments 38 and 40 formed in helical wrap over a nylon rod 42, e.g., quarter-inch nylon rod stock. The wire segments 38 and 40 may be such as No. 10 gauge enamel-coated, copper wire of approximately ten inches length, but many equivalents would be available. One end of wire 38 is electrically fastened to the coax center conductor 28, and one end of the other wire 40 is connected to the braided shield of the co-axial cable. Wires 38 and 40 are then wound spirally onto the rod 42, first in one direction with return of a second layer of the same two wires lying on top of the first layer. An attenuation resistor 43 may be placed across leads 38 and 40 for identification purposes, as will be described below. After the final wrap the wires remain spaced and open as all wires and connections are electrically insulated from the environment. The probe 36 then functions as an electrical inductance and capacitance in a parallel circuit. The parallel circuit is designed to resonate at the fundamental frequency contained within the initial pulse as generated from the control position by pulse generator 44 (FIG. 1).

Pulse generator 44 is connected to provide output directly onto the main conductor 28 of co-axial cable or transmission line 14, and a junction 46 provides a parallel input to the processing circuitry of control position 12. Thus, junction 46 and lead 48 provide input to a gating circuit 50 which functions coactively with digital counter 52 and an RF oscillator 54. Input lead 48 is also applied to an oscilloscope 56 that enables viewing of the complete outgoing and return pulses. Output from digital counter 52 on a line 58 then provides input to each of a computer 60, a digital printer 62, an ancillary display 64 of selected type and a transmitter 66. An output, e.g., from digital printer 62, may also be used to actuate a suitable alarm 68.

The pulse generator 44 initiates operation by generating an initial pulse having a predetermined fundamental frequency and the pulse is input to the central conductor 28 of transmission line 14. Harmonics of this fundamental frequency are virtually eliminated by the transmission characteristics of the co-axial cable, i.e., the transmission line 14. Regarding the probes 36, since a parallel resonant circuit has high impedance at the resonant frequency, only a very small line current will flow through the probe inside the dry cavity, consequently, a very low or negligible signal is reflected back toward the source and detection circuitry at control position 12. This technique allows a plurality of enclosure members 22 and their associated probes 36 to be attached at various points along the same transmission line 14 without an appreciable loss in line current. The terminating resistor 32 then functions to generate an end of transmission line reflection pulse.

At the control position 12, simultaneous with the transmission of an initial pulse down coax conductor 28, an initial pulse is applied to gating circuit 50 to enable the gating and counting circuitry. Thus, if the transmitted pulse encounters either a water-filled enclosure member 22 (See FIG. 4) or the end of cable resistor 32, then a return pulse is sent up the cable and applied via line 48 to gating circuit 50 to actuate the gate. A discrete time interral will have been defined as between the initial pulse and the reflected pulse, during which the digital counter 52 will be counting clock frequency pulses as applied from the RF oscillator 54. The digital counter 52 not only counts the number of clock pulses, a measure of time and/or distance as will be described, and stores such count data, but it also activates the digital printer 62 to produce a permanent record.

In operation, the pulse generator 44 sends a pulse on the order of 100 nanosecond pulse width and approximately 6 volts peak amplitude down the transmission line 14 via conductor 28 while also applying signal on lead 48 to open the gating circuit 50 for activation of counter 52. The digital counter 52 then commences count output from RF oscillator 54 to provide a time measure that is equivalent to distance. The output from oscillator 54 may be, for example, 28 megahertz. If all enclosures 22a—n along the transmission line 14 are dry, the pulse will travel the length of the cable and reflect back upward by virtue of termination resistor 32. The pulse will arrive back at the control position 12 after a time interval that will be indicative of the length of the transmission line 14. The upward returning pulse closes the gating circuit 50 and stops count of the clock frequency at digital counter 52.

Figure 3:
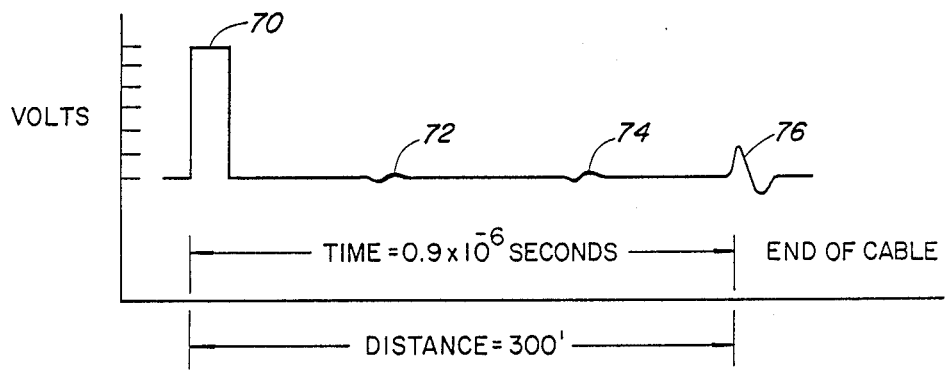
FIG. 3 is a graph of pulse travel in terms of voltage vs. distance and time.

FIG. 3 illustrates a graphic indication of the test system for the case of two enclosures 22. Thus, a voltage indication is indicated versus elapsed time or equivalent distance. An input pulse 70 may be defined as time zero, and indications 72 and 74 not exceeding a pre-set threshold voltage denote dry enclosures 22 as line termination is indicated by reflected pulse 76. The time scale of the graph is equated to distance in proportion to the electric travel time as shown along the abscissa of FIG. 3. Digital readout of distances in feet may be displayed at the control position 12 (FIG. 1).

Figure 4:
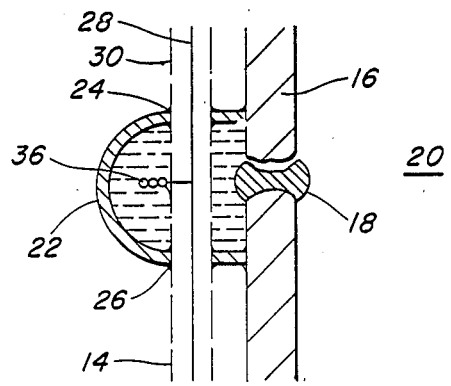
FIG. 4 is an illustration in vertical section of a portion of weldment at fault and the effect relative to the associated enclosure.

The counter 52 includes a sample-rate holding circuit that allows the counter 52 to output the number of clock signals measured between initial pulse 70 and a reflected pulse. Counter 52 then transfers the display data via binary coded decimal signal output to the digital printer 62 for reproduction of the permanent record as shown in FIG. 3. If a crack should develop adjacent to a welded joint as shown in FIG. 4, water entry into the enclosure 22 will change the capacitance of the probe 36 thereby sending the tuned circuit out of resonance with the line input signal. Neglecting resistance, the impedance of the circuit, Z, will then drop according to the following equation:

$$\frac{Z_2}{Z_1} = \frac{\omega^2 L C_1 - 1}{\omega^2 L C_2 - 1} \qquad (1)$$

where
$L$ = inductance
$C_1$ = capacitance of dry probe
$C_2$ = capacitance of wet probe
$\omega = 2\pi f$
$f$ = frequency
$Z_1$ = impedance of dry probe
$Z_2$ = impedance of wet probe A wet probe impedance $Z_2$ may be as much as a factor of 80 lower than the previous dry impedance $Z_1$; however, in actual practice a factor of 20 is adequate to provide proper indication. A line current will circulate through the wetted probe, generating a backward EMF that travels toward the source end; and, upon arrival at the ground position 12, it closes the gating circuit 50 to stop the digital counter 52. A graphic output of the system would then show a full amplitude trouble pulse at the distance of the flooded enclosure 22 relative to the end termination pulse 76. For example, see trouble pulse 86 of FIG. 5A.

Figure 5A:
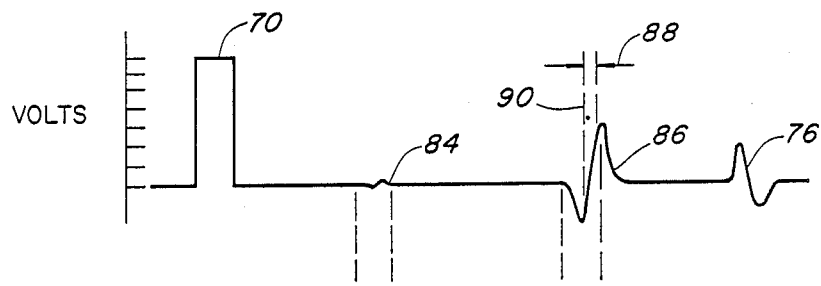
FIG. 5A is an illustration of pulse travel in terms of voltage vs. time or distance.
Figure 5B:
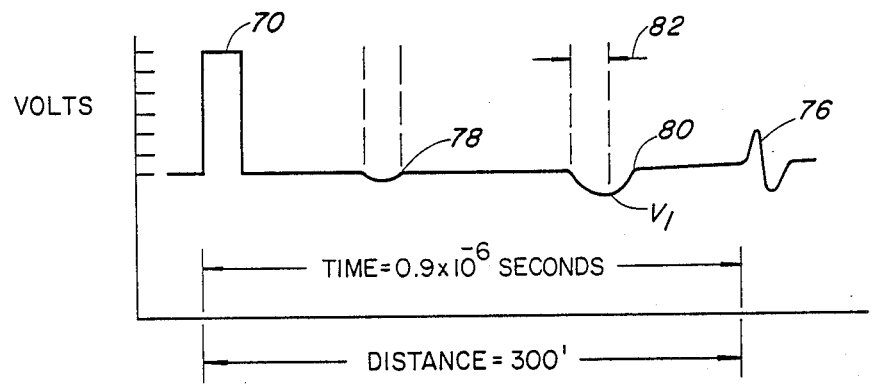
FIG. 5B is another illustration of pulse travel in terms of voltage vs. time or distance.

The system is also unique in that the probe 36 inherently provides the time derivative of the signal produced or reflected. A comparison of graphs FIGS. 5A and 5B illustrates the improvement. FIG. 5B shows the outgoing pulse 70 with voltage pulses or indications normally detected to produce the broad voltage pulses 78 and 80 prior to the termination pulse 76. Voltage pulse 78 indicates only a dry cavity while voltage pulse 80 indicates a wet cavity; but, on a distance scale of 300 feet, the pulse width indicated by arrows 82 denotes a distance uncertainty for the wet cavity of plus or minus 8 feet. The probe 36 (FIG. 2) with its L-C factors provides a pulse differentiation which is illustrated in FIG. 5A. Thus, pulses reflected from a dry cavity show a minimal differential pulse 84 while the wet cavity indicated by original wave form $V_1$ shows up as a time differentiated pulse 86 with arrows 88 denoting a much diminishing distance uncertainty of plus or minus 1 foot. The dash-line 90 at the negative peak marks the gating OFF point with the measurement duration extending part way up the positive peak of pulse 86 to a designated threshold value. The time differentiated pulse, e.g., pulse 86, is a voltage wave form $V_2$ which is approximately equal to $dV_1/dt$ where $V_1$ is the original wave form 80 (FIG. 5B) before differentiation.

In order to monitor the system continually, the pulse generator 44 is set at a repetition rate of a few pulses per second, and the sample rate circuit of digital counter 52 is set to control printer 62 at a selected rate varying from a few samples per second up to as much as several seconds per sample. The system can also detect any malfunctioning of the cable such as would occur if a cable broke or became electrically shorted. This would be indicated by display of a numerical value representation of the distance to the break or short circuit.

Figure 6:
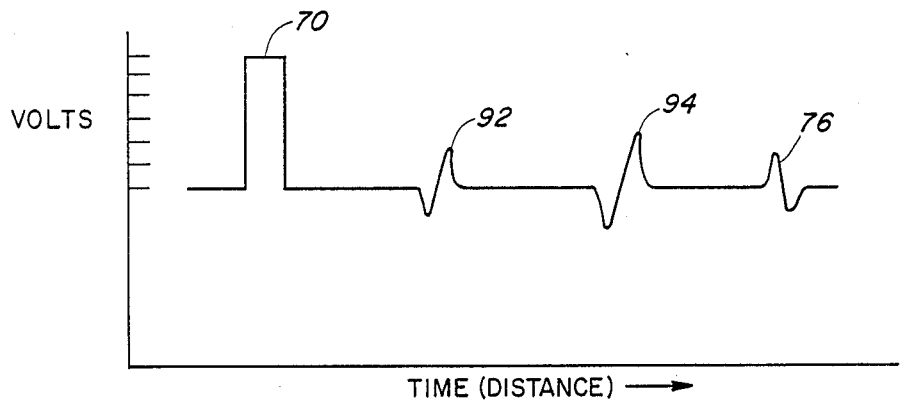
FIG. 6 is an illustration of pulse travel in terms of voltage vs. time or distance for a case of multiple leakage detections.

The monitoring system also provides means to determine if more than one enclosure 22a—n has a crack or leakage detected at the same time. The attenuation resistor 43 shunted across each probe 36 will provide a characteristic resistance indication. The resistor values 43 may be graduated with the resistor 43 for the nearest probe 36a having a smallest value of resistance, while each succeeding probe 36b—n has a progressively larger value of resistance which distinguishes that respective probe 36. FIG 6 illustrates graphically the situation wherein two probes 36 have detected the presence of water within their respective enclosures 22. The outgoing pulse 70 effects gating ON of the digital counter 52 as the successive return pulses 92 and 94 effect first gating OFF and second gating OFF respectively. The trigger level of gating circuit 50 is manually or automatically scanned in order to measure the distance to each reflected pulse 92 and 94.

While the system is fully capable of automatic function, still additional data may be obtained with the utilization of computer 60. Additional data such as text characters can be printed and the data can be telemetered to remote locations. Also, mathematical analysis of data or combinations of data can be used to eliminate spurious electrical noise that may become a problem during adverse environmental conditions.

The foregoing discloses a novel leakage detective system that uses time domain reflectometry to monitor the condition of selected void spaces. The system is especially attractive for use in monitoring the condition of weldments and other critical metal points in and around tanks and underwater barbettes wherein salt water leakage can bring about rapid destruction of metal structure. The system can function automatically and can produce hard copy readout not only of any structural failure which might allow water to enter a protective enclosure, but also it can continually monitor the condition of the entire length of test cable. Various types of alarms may be included to alert personnel before structural failures become catastrophic, and any number of further finite indications can be derived by the associated digital computer.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A system for monitoring integrity of underwater structures, comprising:
   at least one enclosure member sealingly secured over at least one selected area of the underwater structure, each enclosure member maintaining a dry void;
   a coaxial cable having a central conductor and centric shield, and having an input above water and extending down through said at least one enclosure member in water-tight passage, said cable terminating in characteristic resistance and water-tight enclosure;
   a least one probe having a segment of insulative rod material and a pair of generally equi-spaced wires wound helically on said segment in one direction and reverse wound in overlap to terminate in an open end, and connected between the cable central conductor and shield and being disposed in each at least one dry void, said probe being wound to function as a parallel inductance and capacitance circuit that is resonant at a preselected frequency;
   means generating a pulse having said preselected frequency as the fundamental frequency applied as said input to the coaxial cable; and
   means detecting any reflected pulse on said coaxial cable.

2. A system as set forth in claim 1 wherein:
   said segment is an approximately 2.5 inch rod of quarter inch plastic insulator; and
   said pair of wires is wound loosely with several turns in each direction and insulated in non-shorting overlap and the immediate environment.

3. A system as set forth in claim 2 wherein:
   said rod material is nylon and the wires are each enamel-coated, copper wire of about ten gauge thickness.

4. A system as set forth in claim 1 wherein said means detecting comprises:
   gate means enabled by said generated pulse input to the coaxial cable and disabled by said reflected pulse; and
   count means controlled by said gate condition to generate a pulse output indicative of distance along said coaxial cable.

5. A system as set forth in claim 4 which is further characterized to include:
   a digital computer receiving said pulse output to generate monitoring data as to the condition of the at least one enclosure members.

6. A system as set forth in claim 4 wherein:

said generated pulse output is binary coded decimal pulse.

7. A system as set forth in claim 4 which is further characterized to include:
a transmitter receiving said pulse output for transmission to a remote location.

8. A system as set forth in claim 4 wherein said count means comprises:
an oscillator producing a known frequency signal output;
a digital counter receiving input of the oscillator signal output and enabled during the gate enabled period to generate said pulse output indicative of distance; and
indicating means receiving said pulse output and presenting visual indication of the location of any pulse reflection from said coaxial cable.

9. A system as set forth in claim 8 wherein said indicating means comprises:
a digital printer receiving said pulse output.

10. A system as set forth in claim 8 wherein said indicating means comprises:
means providing visual display and alarm in response to selected conditions of said pulse output.

* * * * *